United States Patent
Adachi

(10) Patent No.: US 8,841,878 B2
(45) Date of Patent: Sep. 23, 2014

(54) MOBILE ELECTRONIC DEVICE

(75) Inventor: Yoshikazu Adachi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 789 days.

(21) Appl. No.: 12/892,581

(22) Filed: Sep. 28, 2010

(65) Prior Publication Data

US 2011/0074337 A1 Mar. 31, 2011

(30) Foreign Application Priority Data

Sep. 28, 2009 (JP) ................. 2009-223559

(51) Int. Cl.
*H02J 7/00* (2006.01)
*H01M 10/46* (2006.01)

(52) U.S. Cl.
CPC ............. *H01M 10/465* (2013.01); *Y02E 60/12* (2013.01)
USPC .......................................... 320/101; 320/159

(58) Field of Classification Search
USPC ................. 320/101, 107, 114, 138, 139; 136/243–245, 251, 291
See application file for complete search history.

(56) References Cited

U.S. PATENT DOCUMENTS

| | | | | |
|---|---|---|---|---|
| 4,977,353 A | * | 12/1990 | Helal et al. | 315/130 |
| 5,039,928 A | * | 8/1991 | Nishi et al. | 320/101 |
| 5,642,030 A | * | 6/1997 | Seelye | 320/101 |
| 5,959,432 A | * | 9/1999 | Saurer et al. | 320/101 |
| 6,476,583 B2 | * | 11/2002 | McAndrews | 320/119 |
| 7,165,641 B2 | * | 1/2007 | Kitamura | 180/206.2 |
| 7,486,044 B2 | * | 2/2009 | Patino et al. | 320/103 |
| 7,852,048 B2 | * | 12/2010 | Kawk et al. | 320/167 |
| 7,976,975 B2 | * | 7/2011 | Ajiki | 429/111 |
| 2004/0185920 A1 | * | 9/2004 | Choi et al. | 455/575.1 |
| 2007/0285053 A1 | * | 12/2007 | Noguchi et al. | 320/114 |
| 2008/0053518 A1 | * | 3/2008 | Chang et al. | 136/252 |
| 2008/0084177 A1 | * | 4/2008 | Sander et al. | 320/101 |
| 2008/0258678 A1 | * | 10/2008 | Kanouda et al. | 320/101 |
| 2009/0054110 A1 | * | 2/2009 | Tseng | 455/573 |
| 2009/0179611 A1 | * | 7/2009 | Sander et al. | 320/101 |
| 2011/0006905 A1 | * | 1/2011 | Masuda | 340/636.1 |

FOREIGN PATENT DOCUMENTS

JP 2008-287162 A 11/2008

* cited by examiner

*Primary Examiner* — Drew A Dunn
*Assistant Examiner* — Steve T Chung

(57) ABSTRACT

An electronic device is disclosed. The electronic device comprises at least one solar cell, and voltage-detection means operable to detect an output voltage of the at least one solar cell to obtain a detected output voltage. The electronic device also comprises control means operable to detect an operation of the at least one solar cell based on the detected output voltage, and to perform a predefined control depending on the operation.

17 Claims, 17 Drawing Sheets

| Photosensor output voltage (V) | Amplifier gain (dB) | Detection threshold (V) |
|---|---|---|
| 0~0.5 | 14 | 0.1 |
| 0.5~1.0 | 8 | 1.0 |
| 1.0~2.5 | 0 | 1.5 |

Process 300

Mobile phone 500

FIG.7B

| Photosensor output voltage (V) | Amplifier gain (dB) |
|---|---|
| 0~0.5 | 14 |
| 0.5~1.0 | 8 |
| 1.0~2.5 | 0 |

FIG.10D

| Photosensor output voltage (V) | Amplifier gain (dB) | Detection threshold (V) |
|---|---|---|
| 0~0.5 | 14 | 0.1 |
| 0.5~1.0 | 8 | 1.0 |
| 1.0~2.5 | 0 | 1.5 | ature of the drawings.

MOBILE ELECTRONIC DEVICE

CROSS-REFERENCE TO RELATED APPLICATION

The present application claims priority under 35 U.S.C. §119 to Japanese Patent Application No. 2009-223559, filed on Sep. 28, 2009, entitled "Mobile Electronic Device". The content of which is incorporated by reference herein in its entirety herein.

FIELD

Embodiments of the present disclosure relate generally to mobile electronic devices, and more particularly relate to mobile electronic devices comprising a solar cell.

BACKGROUND

A mobile electronic device that comprises a solar cell may perform predefined processing (e.g., charging a battery) using a voltage generated by the solar cell. Effective utilization of such mobile electronic devices that have a solar cell is desired.

SUMMARY

A method for operating an electronic device is disclosed. The method detects an output voltage of a solar cell to obtain a detected output voltage, and detects an operation of the solar cell based on the detected output voltage. The method further performs a predefined control depending on the operation. In this manner, the solar cell charges a battery as well as functioning as an input device, thereby reducing complexity and size of an electronic device while providing convenience for a user thereof.

In a first embodiment, a mobile electronic device comprises at least one solar cell, an electronic component, a first voltage-detection module, and a control module. The electronic component is charged by an output voltage of the at least one solar cell. The first voltage-detection module detects the output voltage to obtain a detected output voltage. Furthermore, the control module detects an operation of the at least one solar cell based on the detected output voltage, and performs a predefined control based on the operation.

In a second embodiment, a method for operating a mobile electronic device monitors and detects an output voltage of at least one solar cell. The method further detects an operation of the at least one solar cell based on the output voltage, and performs a predefined control based on the operation.

In a third embodiment, a mobile electronic device comprises at least one solar cell, voltage-detection means, and control means. The voltage-detection means detects the output voltage of the at least one solar cell to obtain a detected output voltage. The control means detects an operation of the at least one solar cell based on the detected output voltage and performs a predefined control in response to detecting the operation.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 10D is a table showing a state of voltage detected by a first voltage-detection module according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phones, and the techniques described herein may also be utilized in other applications. For example, embodiments may be applicable to digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1A:
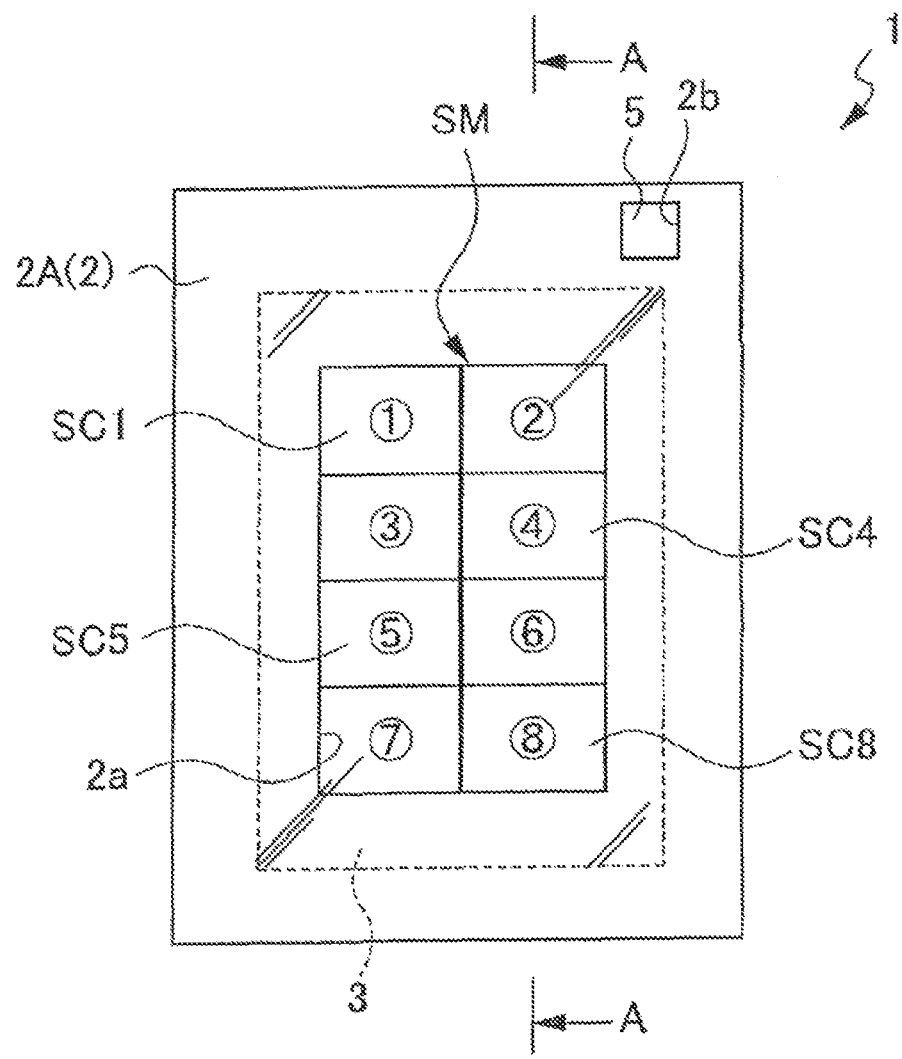
FIG. 1A is an illustration of a front view of a mobile phone according to an embodiment of the disclosure.
Figure 1B:
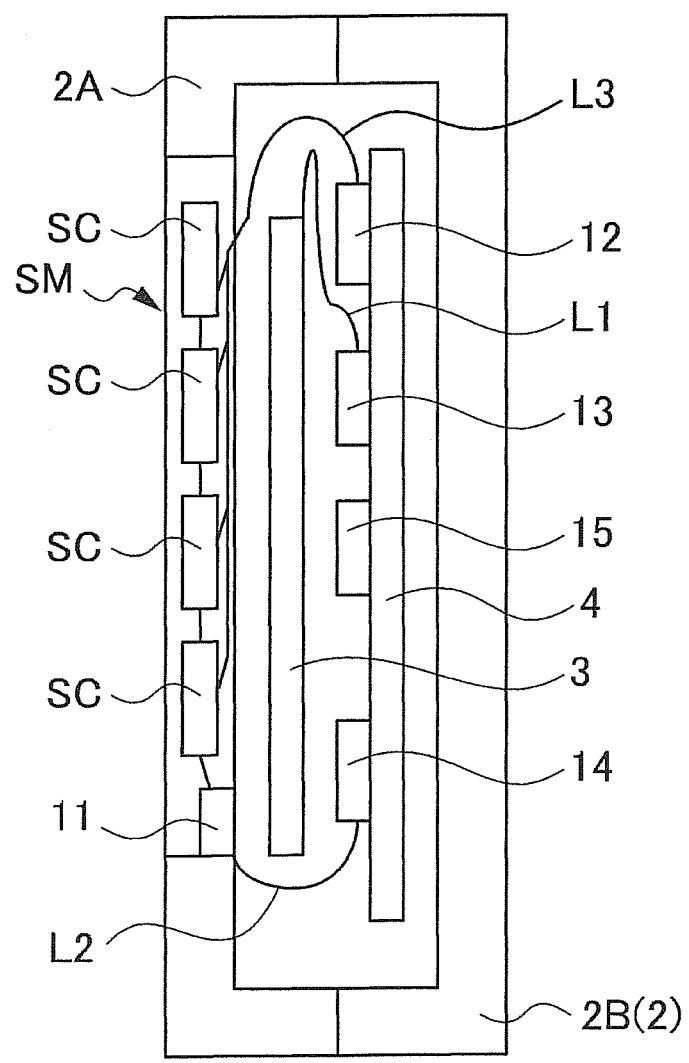
FIG. 1B is an illustration of a cross-sectional view along a line A-A in FIG. 1A.
Figure 2:
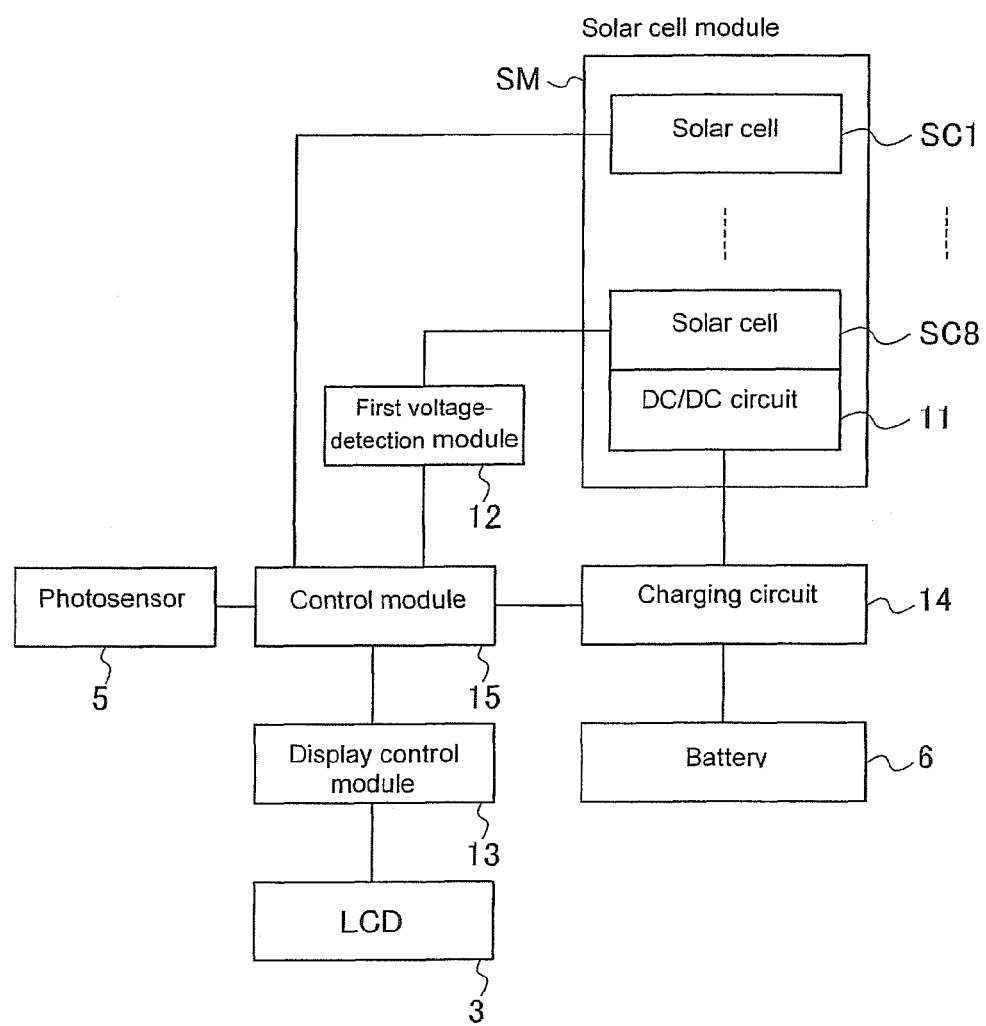
FIG. 2 is an illustration of a schematic functional block diagram of a mobile phone according to an embodiment of the disclosure.

As shown in FIGS. 1A, 1B, and 2, a mobile phone 1 comprises a case 2 (2A, 2B), a solar cell module SM, a Liquid Crystal Display 3 (LCD 3), a substrate 4, a photosensor 5, and a battery 6 (electronic component).

The case 2 comprises an upper case 2A and a lower case 2B. In the upper case 2A, a first opening 2a and a second opening 2b are formed. The solar cell module SM is exposed to the outside from the first opening 2a. The photosensor 5 is exposed to the outside from the second opening 2b.

The solar cell module SM is light-permeable, and comprises solar cells SC 1, SC 2, and so on, that are light-permeable, a glass plate (not shown), a frame (not shown), and a DC/DC circuit 11.

A solar cell SC (e.g., SC 1, 2 . . . ) is anchored inside a plurality of stacking glass plates. The anchoring is realized with an adhesive such as an adhesive plastic. Moreover, the plurality of stacking glass plates is fixed from the outside by a frame. The solar cell SC is coupled to the DC/DC circuit 11. The solar cell SC is, for example but without limitation, a silicon solar cell comprising a stacking structure of semiconductors formed of silicon, and the like. The stacked semiconductors comprise, for example but without limitation, an n-type semiconductor with phosphorus added to silicon, and a p-type semiconductor with boron added to silicon, and the like. The solar cell SC is not limited to a silicon solar cell if the underlying LCD 3 is viewed from the outside via the solar cell module SM. For example but without limitation, the solar cell SC may be an inorganic chemical-based solar cell, an organic compound-based solar cell, and the like. The inorganic chemical-based solar cell, may be for example but without limitation, gallium (n-type semiconductor), arsenic (p-type semiconductor), or indium (n-type semiconductor), phosphorus (p-type semiconductor), and the like. The inorganic chemical-based solar cell may comprise, for example but without limitation, an n-type semiconductor of C60 fullerene, carbon nanotubes, and the like. The solar cell SC receives light such as sunlight and generates voltage in accordance with the receiving light.

The DC/DC circuit 11 is an AC/DC switch device such as an inverter. The DC/DC circuit 11 is coupled to the solar cell SC. The DC/DC circuit 11 converts DC voltage (voltage) generated by the solar cell SC into AC voltage. The AC voltage is used for charging the battery 6, etc.

The LCD 3 (display screen) comprises a liquid crystal element (not shown) and a liquid crystal panel (not shown). The liquid crystal element displays information based on signals from a control module 15 (FIG. 2) on a display surface. The liquid crystal panel comprises a backlight (not shown). The LCD 3 is placed within the case 2 and is viewed from the outside via the solar cell module SM.

The substrate 4 is a circuit substrate placed more within the case 2 than the LCD 3 as shown in FIG. 1B. The substrate 4 comprises a display control module 13, a charging circuit 14, a first voltage-detection module 12, and a control module 15.

The display control module 13 is coupled to the LCD 3 by a LCD-controlling line L1. The display control module 13 controls display of the LCD 3 based on signals from the control module 15.

The charging circuit 14 is coupled to the battery 6 by a charging output line L2. The charging circuit 14 charges the battery 6 via the DC/DC circuit 11 using the voltage generated by the solar cell SC, based on signals received from the control module 15.

The first voltage-detection module 12 is coupled to the solar cell SC by a voltage-detecting output line L3. The first voltage-detection module 12 detects voltage generated by the solar cell SC (output voltage of the solar cell SC).

The control module 15 is configured to support functions of the mobile phone 1. For example, the control module 15 may control operations of the mobile phone 1 so that processes of the mobile phone 1 are suitably performed. For example, the control module 15 controls the display control module 13, the charging circuit 14, the first voltage-detection module 12, etc., to detect an operation of a solar cell based on the output voltage, and performs a predefined control based on the operation as explained in more detail below. The control module 15, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the control module 15 comprises processing logic that is configured to carry out the functions, techniques, and processing tasks associated with the operation of the mobile phone 1. In particular, the processing logic is configured to support operation of the solar cell SC.

The photosensor 5 exposes a light-receiving surface from the second opening 2b in the upper case 2A. The photosensor 5 detects brightness (amount of light) around the mobile phone 1 from outside light, which the light-receiving surface detects. It is preferable that an externally-exposed surface of the solar cell SC and the light-receiving surface of the photosensor 5 be placed in the same plane so that they are under the same light-receiving environment. In this manner, the solar cell SC and the photosensor 5 are placed in the case 2A such that their respective portions exposed to an outside are coplanar.

The battery 6 is charged with voltage generated by the solar cell SC. The battery 6 feeds power to the LCD 3, etc. That is, the battery 6 functions as an electronic component that operates based on the voltage generated by the solar cell SC. The mobile phone 1 uses the voltage generated by the solar cell SC, for example, to charge the battery 6. Moreover, the mobile phone 1 also allows the solar cell SC to function as an input device. In this manner, the control module 15 detects an operation on the solar cell SC, as indicated by the detection result from the first voltage-detection module 12, and the control module 15 performs predefined control depending on the operation. That is, the solar cell SC functions as the input device.

The control module 15 detects the operation on the solar cell SC in response to a change in the voltage detected by the first voltage-detection module 12. For example, when a touch operation is performed on the solar cell SC, the solar cell SC may be covered with a finger etc., thereby changing an amount of light received by the solar cell SC. The first voltage-detection module 12 detects a voltage change due to the change in the amount of light. The control module 15 performs a predefined control operation assigned to the solar cell SC based on the voltage change, such as for example but without limitation, display of the LCD 3, reference to the status as to whether there is any unopened mail, and the like.

The control module 15 performs the predefined control operation based on whether the amount of light received by the solar cell SC and the voltage detected by the first voltage-detection module 12 are decreased. Alternatively, the control module 15 performs the predefined control based on whether the solar cell SC is illuminated with light such as a stylus pen with LED mounted on a tip thereon, and the like, and the voltage detected by the first voltage-detection module 12 is increased accordingly.

The mobile phone 1 can charge the battery 6 using the solar cell SC. Moreover, the mobile phone 1 allows the solar cell SC to function as an input device similar to a key button or a touch panel that is of capacitance type, etc.

This charging of the battery 6 and the function as an input device are realized using the light-receiving surface of the solar cell SC. Therefore, it is not necessary to design separate modules for charging of the battery 6 and the function as an input device. In this manner, flexibility in design of a device such as the mobile phone 1 increases, and attempt can be made to downsize the device. Moreover, the mobile phone 1 can be used more conveniently by a user when using the solar cell SC also as an input device such as key button, or touch panel, and the like. In this manner, the mobile phone 1 provided effective utilization as a mobile electronic device that comprises the solar cell SC.

Furthermore, the LCD 3 is viewed from the outside via the solar cell module SM, which is light-permeable; hence, a user can use the solar cell SC as an input device while confirming the display content displayed by the LCD 3. That is, the mobile phone 1, with the LCD 3 and the solar cell SC, provides a similar function to a touch panel.

In one embodiment, the voltage generated by the solar cell SC may be used for lighting the LCD 3. In this manner, it is not necessary to light the LCD 3 by power fed from the battery 6, hence, power consumption of the battery 6 can be reduced.

In one embodiment, if the mobile phone 1 is located in a dark location with no or limited light, such as in a bag, it is assumed that the amount of light received by the solar cell SC is lost. In this case, the solar cell SC does not generate any voltage. Even if an operation is performed on the solar cell SC under this condition, the solar cell SC does not generate any voltage; hence, the first voltage-detection module 12 does not detect any change in the voltage. Therefore, even if an operation is performed on the solar cell SC, the control module 15 does not perform the predefined control that is based on a change in the voltage detected by the first voltage-detection module 12.

On the other hand, in a dark location it is assumed that it is less likely that there will be situations in which users perform operations. Therefore, even if the mobile phone 1 is in the dark location operability of the mobile phone 1 is not compromised.

The control module 15 detects an operation on the solar cell SC and perform a predefined control based on the operation, if a change in the voltage detected by the first voltage-detection module 12 exceeds a first threshold. Therefore, for example, even if the surrounding area of the mobile phone 1 becomes dark and the amount of light received by the solar cell SC is reduced, it is not determined that there is an operation on the solar cell SC unless a predefined first threshold Tv is exceeded. In this manner, likelihood of false detection in the first voltage-detection module 12 is reduced.

In one embodiment, the control module 15 detects an operation of some of the solar cells SC out of the plurality of solar cells SC and performs predefined control depending on the operation, if a change in the voltage detected by the first voltage-detection module 12 exceeds the first threshold Tv. Therefore, mobile phone 1 can cause some of the solar cells SC out of the plurality of solar cells SC to function as a main input means such as a key button or touch panel and the like.

Moreover, the mobile phone 1 may have an adjustment part 17 The adjustment module 17 (FIG. 5) adjusts the voltage detected by the first voltage-detection module 12 to a first predefined value by a control of the control module 15. The adjustment module 17, may comprise an amplifier to amplify the detected voltage.

In one embodiment, the control module 15 detects an operation of the solar cell SC, and performs a predefined control in response to detecting the operation, if a change in the output voltage of the solar cell SC, adjusted to the first predefined value by the adjustment module 17, exceeds the first threshold Tv.

If the change in the output voltage of the solar cell SC exceeds the first threshold Tv, even without any operation, the control module 15 can both detect an operation on the solar cell SC and perform predefined control in response to detecting the operation. That is, the control module 15 is likely to perform control based on false detection of operations. In such a case, the adjustment module 17 adjusts the voltage generated by the solar cell SC to the first predefined value. This enables the voltage generated by the solar cell SC to reduce likelihood of control based on false detection of operations.

If the voltage generated by the solar cell SC does not reach a second predefined value, the control module 15 controls the adjustment module 17 to adjust the voltage detected by the first voltage-detection module 12 to a predefined value.

If the surrounding area is dark, the amount of light received by the solar cell SC is reduced, and the voltage generated by the solar cell SC also becomes a small value. In this case, even if an operation on the solar cell SC is performed, the change in the voltage is small. Therefore, if the surrounding area is dark, it is not easy for the control module 15 to detect an operation on the solar cell SC. However, since if the voltage generated by the solar cell SC does not reach a second predefined value, the control module 15 controls the adjustment module 17 (amplifier) and adjusts the voltage detected by the first voltage-detection module 12 to a predefined value.

Therefore, even for cases in which the surrounding area becomes dark and it becomes not easy to detect the operation on the solar cell SC, the mobile phone 1 can easily detect the operation on the solar cell SC.

Moreover, when the voltage generated by the solar cell SC is equal to or greater than the second predefined value (if the surrounding area is somewhat bright and the operation on the solar cell SC can be easily detected), control of the adjustment module 17 is not performed; hence, simplified control of the control module 15 is attempted.

Moreover, if the amount of light detected by the photosensor 5 does not reach a third predefined value, the adjustment module 17 is controlled by the control module 15 to adjust the voltage detected by the first voltage-detection module 12 to a predefined value.

Therefore, even for cases in which the surrounding area becomes dark and it becomes not easy to detect the operation on the solar cell SC, the mobile phone 1 can easily detect the operation on the solar cell SC.

Moreover, the control module 15 may change the first threshold Tv based on an amount of adjustment of the voltage generated by the solar cell SC by the adjustment module 17.

If the output voltage of the solar cell SC is adjusted (amplified) by the adjustment module 17, noise n is also amplified along with the output voltage. Taking this noise n into consideration, the control module 15 changes the first threshold Tv according to magnitude of amplification of the output voltage of the solar cell SC by the adjustment module 17. That is, if the magnitude of amplification is small, the noise n to be amplified is also small; hence, the control module 15 sets the first threshold Tv to a small value. For example, the control module 15 sets the first threshold Tv to a value close to a voltage in a non-operating state. In this manner, it is easier for the control module 15 to detect the operation on the solar cell SC.

On the other hand, if the magnitude of amplification of the output voltage of the solar cell SC is large, the noise n to be amplified is also large; hence, the control module 15 sets the first threshold Tv to a large value. For example, the control module 15 sets the first threshold Tv to a value away from the voltage in the non-operating state. If the first threshold Tv is a value away from the voltage in the non-operating state, due to amplification of the noise n, the output voltage of the solar cell SC is less likely to exceed the first threshold Tv. That is, false detection for the solar cell SC resulting from the noise n is reduced.

In addition, for cases in which the control module 15 sets the first threshold Tv to a value away from the voltage in the non-operating state, it is assumed that the surrounding area of the mobile phone 1 is dark. In this case, if an operation is performed on the solar cell SC, an amount of light received by the solar cell SC is likely to be almost zero. Therefore, even for cases in which the first threshold Tv is set to a value away from the voltage in the non-operating state, when an operation is performed on the solar cell SC, the change in the output voltage of the solar cell SC detected by the first voltage-detection module 12 is likely to exceed the first threshold Tv. That is, even when the first threshold Tv is set to a value away from the voltage in the non-operating state, the operation on the solar cell SC can be easily detected.

In an embodiment, the mobile phone 1 comprises a second voltage-detection module 16 that detects the output voltage of the photosensor 5. If the difference between the output voltage of the solar cell SC detected by the first voltage-detection module 12 and the out voltage of the photosensor 5 detected by the second voltage-detection module 16 exceeds a second threshold Tv, the control module 15 detects an operation on the solar cell SC, and in response to detection of the operation, performs a predefined control depending on the operation. In this manner, it is determined whether a change in the out voltage of the solar cell SC is a change caused by the overall brightness in the surrounding area of the solar cell SC or a change caused by the operation on the solar cell SC, thereby likelihood of detection of false operation is reduced.

Figure 3:
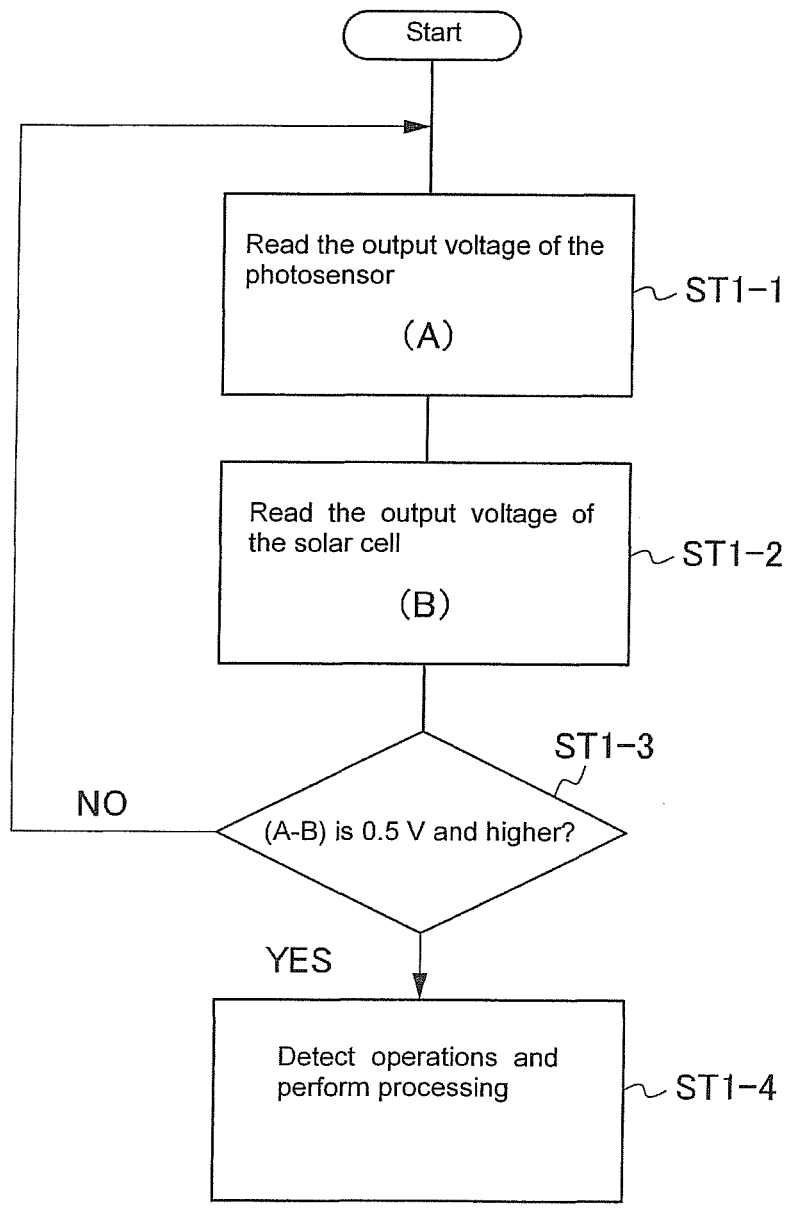
FIG. 3 is an illustration of a flowchart showing an operation of a mobile phone according to an embodiment of the disclosure.
Figure 4:
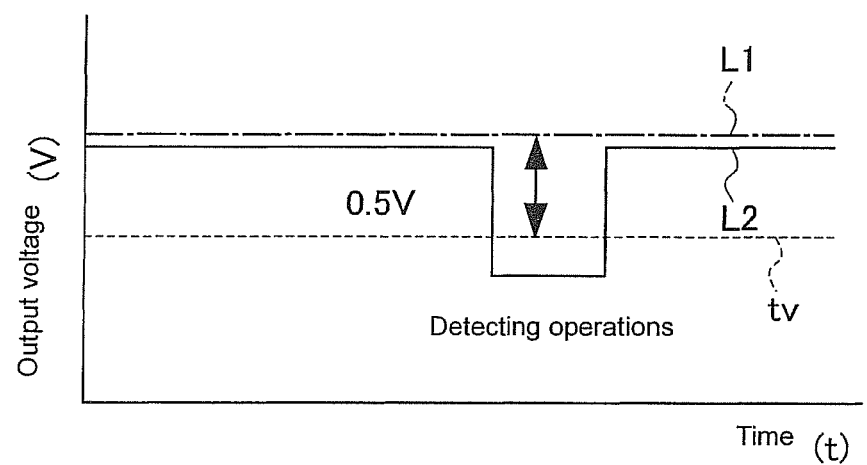
FIG. 4 is a graph of output voltage vs. time showing voltage detection in a first voltage-detection module according to an embodiment of the disclosure.

FIG. 3 is an illustration of a flowchart showing an operation process 300 of a mobile phone according to an embodiment of the disclosure. FIG. 4 is a graph of output voltage vs. time showing voltage detection in a first voltage-detection module 12 according to an embodiment of the disclosure. Process 300 is described herein in conjunction with FIG. 3 and FIG. 4. The various tasks performed in connection with the process 300 may be performed by software, hardware, firmware, a computer-readable medium having computer executable instructions for performing the process method, or any combination thereof. Process 300 may include any number of additional or alternative tasks, the tasks shown in FIG. 3 need not be performed in the illustrated order, and process 300 may be incorporated into a more comprehensive procedure or process having additional functionality not described in detail herein. For illustrative purposes, the following description of process 300 may refer to elements mentioned above in connection with FIGS. 1-2. In practical embodiments, portions of process 300 may be performed by different elements of the mobile phone 1. The process 300 may have functions, material, and structures that are similar to the embodiments shown in FIGS. 1-2. Therefore common features, functions, and elements may not be redundantly described here.

Process 300 may begin by reading the output voltage (A) of the photosensor 5 (task ST1-1). Specifically, the control module 15 reads the output voltage (A) of the photosensor 5 detected by the second voltage-detection module 16. The output voltage (A) characterizes the brightness around the mobile phone 1.

Process 300 may then continue by reading the output voltage (B) of the solar cell SC (task ST1-2). Specifically, the control module 15 reads the output voltage (B) generated by the solar cell SC that is detected by the first voltage-detection module 12. The first voltage-detection module 12 individually and separately detects voltage generated by the plurality of solar cells SC. The control part 15 individually and separately monitors voltage changes generated by the plurality of solar cells SC.

Process 300 may then continue by determining whether a difference between the output voltage (A) and the output voltage (B) (voltage difference A-B) is greater than or equal to 0.5 V (inquiry task ST1-3). In this manner, the control module 15 calculates the difference between the output voltage (A) of the photosensor 5 and the output voltage (B) of the solar cell SC. As shown in FIG. 4, the control module 15 determines whether the difference between the output voltage (A) and the output voltage (B) exceeds a predefined threshold such as the first threshold Tv (i.e., 0.5 V).

If the voltage difference A-B is less than 0.5 Volt (NO branch of inquiry task ST1-3), process 300 leads back to task ST1-1.

If the voltage difference A-B is equal to or higher than 0.5 V (Yes branch of inquiry task ST1-3), process 300 detects an operation and performs processing (task ST1-4). In this manner, it is determined that an operation on the solar cell SC is performed, and predefined processing is performed depending on the operation.

In one embodiment, presence or absence of the operation on the solar cell SC is determined based on a change in a voltage generated by the solar cell SC instead of the voltage difference A-B described above. In this manner the mobile phone 1 uses the solar cell SC as a voltage source that generates voltage, as well as an input device to receive user's input.

The control module 15 individually and separately monitors voltage changes generated by the plurality of solar cells SC. Therefore, the control module 15 corresponds to so-called multi-touch, which detects concurrent operations of the solar cells SC. In this way, a highly convenient input device is provided by the mobile phone 1.

As mentioned above, the solar cell SC functions as a touch panel because it is placed on the LCD 3. Furthermore, because a plurality of solar cells SC is located on the LCD3, the solar cells SC function as a main input device. Therefore, the mobile phone 1 can omit input devices such as key buttons and use the solar cells SC instead. In this manner, design of the mobile phone 1 is enhanced, and the size and weight of the mobile phone 1 can be reduced.

This enables the mobile phone 1 to use the solar cell SC as a voltage source that generates voltage, and concurrently, also use it as an input device.

Figure 5:
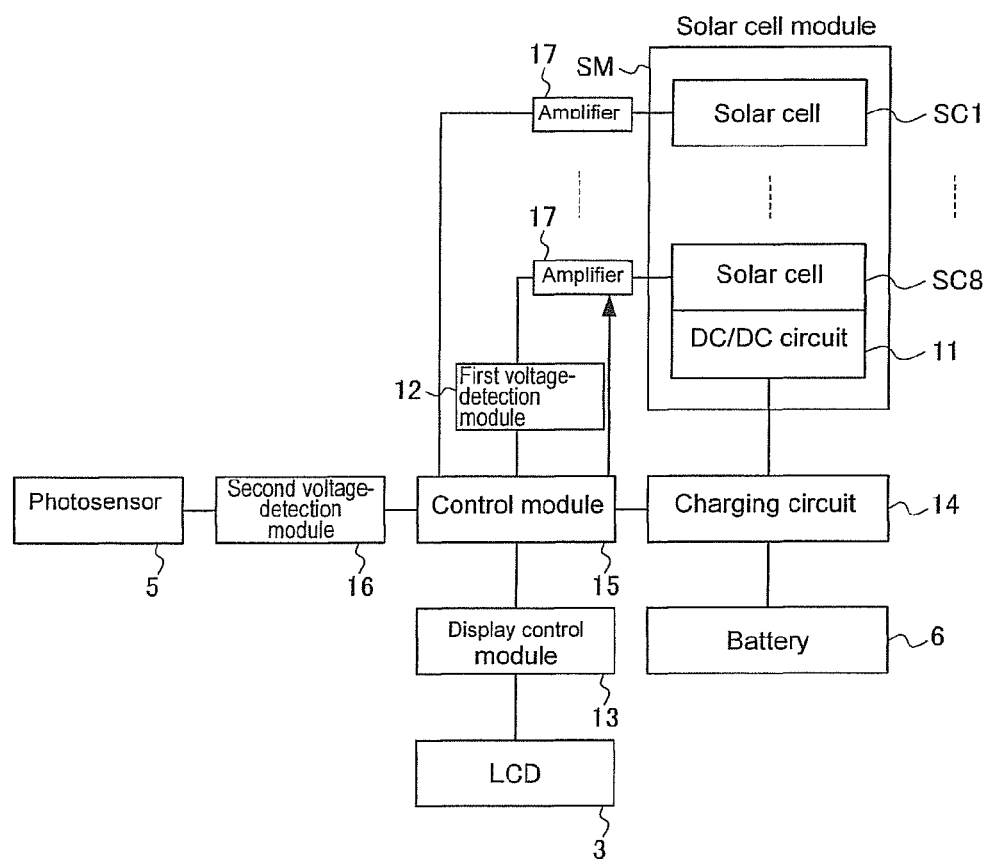
FIG. 5 is an illustration of a functional block diagram of a mobile phone according to an embodiment of the disclosure.

FIG. 5 is an illustration of a functional block diagram of a mobile phone 500 according to an embodiment of the disclosure. The mobile phone 500 may have functions, material, and structures that are similar to the embodiments shown in FIGS. 1-2. Therefore common features, functions, and elements may not be redundantly described here. The mobile phone 500 provides a method for using same in a dark place. In this manner and in comparison to the mobile phone 1 shown in FIG. 2, the mobile phone 500 comprises an amplifier 17 (adjustment module) that adjusts (amplifies) the output voltage generated by the solar cell SC.

Figure 6:
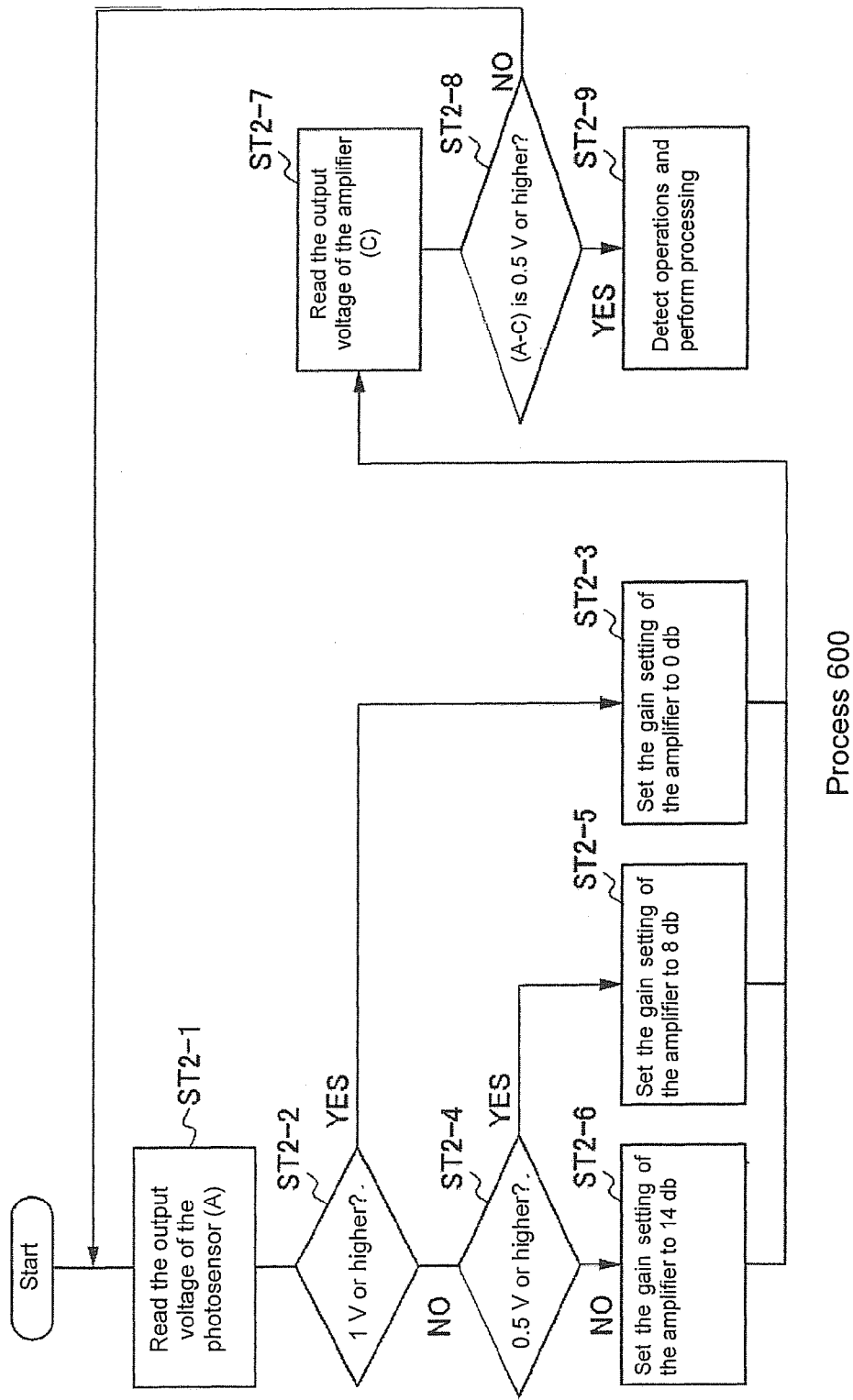
FIG. 6 is an illustration of a flowchart showing an operation of a mobile phone according to an embodiment of the disclosure.

FIG. 6 is an illustration of an exemplary flowchart showing a process 600 according to an embodiment of the disclosure. FIG. 7 is an illustration of graph showing an output voltage vs. an amplifier gain according to the third embodiment. The various tasks performed in connection with the process 600 may be performed by software, hardware, firmware, a computer-readable medium having computer executable instructions for performing the process method, or any combination thereof. Process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5 and 7. In practical embodiments, portions of process 600 may be performed by different elements of the mobile phone 1. The process 600 may have functions, material, and structures that are similar to the embodiments shown in FIGS. 1-4. Therefore common features, functions, and elements may not be redundantly described here.

Process 600 may begin by the mobile phone 1 reading an output voltage (A) from the photosensor 5 (task ST2-1). Specifically, the control module 15 reads the output voltage of the photosensor 5 detected by the second voltage-detection module 16 to detect amount of the brightness around the mobile phone 1. In one embodiment, brightness around the mobile phone 1 may be detected, by detecting a change in the output voltage of the solar cells SC instead of detecting the out voltage of the photosensor 5. Using an average value of the output voltage of the plurality of the solar cell SC as a reference voltage, improves accuracy of detection of an operation on the solar cell SC.

Figure 7A:
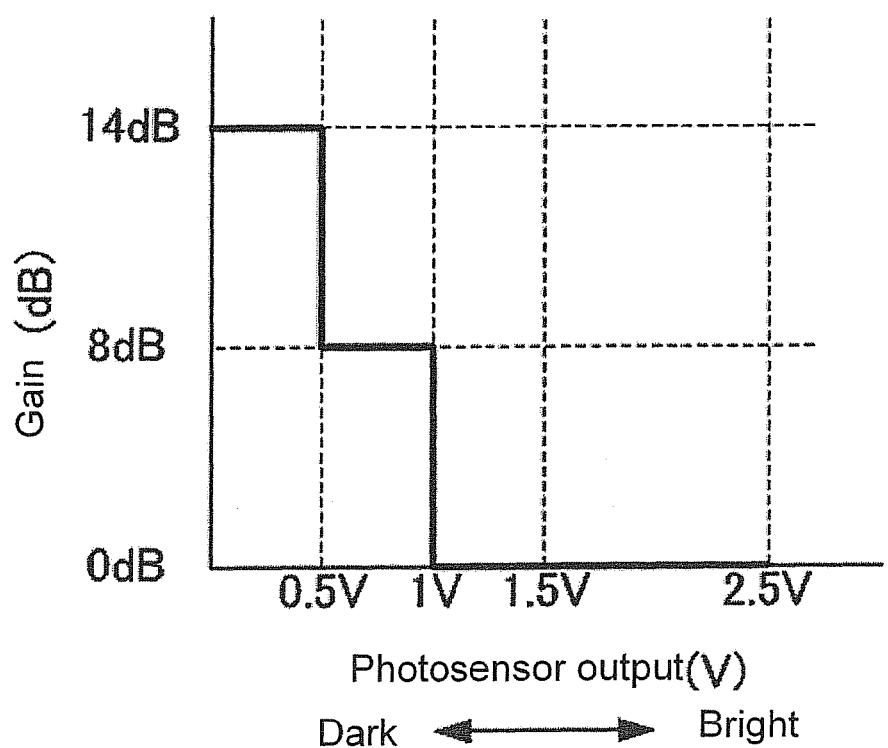
FIG. 7 is an illustration of a graph showing an output voltage vs. an amplifier gain according to an embodiment of the disclosure.

Process 600 may then continue by the control module 15 determining whether the output voltage of the photosensor 5 is greater than or equal to 1 Volt (inquiry task ST2-2). The control module 15 determines whether an amplification by the amplifier 17 is needed to enhance detection accuracy for the change in the output voltage of the solar cell SC. For example, the control module 15 may use a functional relationship as shown in FIGS. 7A and 7B to amplify the output voltage of the photosensor 5. As shown in FIGS. 7A and 7B, the output voltage of the photosensor 5 is divided into three tasks and the output voltage generated by the solar cell SC is adjusted according to the output voltage of the photosensor 5. However, the embodiments of the disclosure are not limited to the relationship shown in FIGS. 7A and 7B. For example, the output voltage of the solar cell SC may be linearly adjusted by multiplying the output voltage from the photosensor 5 by a predefined coefficient to set a voltage gain value of the amplifier 17.

If the output voltage of the photosensor 5 is higher than a predefined value such as 1 V (Yes branch of inquiry task ST2-2). Process 600 may proceed by the control module 15 setting the voltage gain of the amplifier 17 to 0 dB (task ST2-3) such that the amplifier 17 does not amplify the output voltage of the solar cell SC. Process 600, may then continue by the control module 15 reading the output voltage (C) of the amplifier 17 (task ST2-7). In this manner, the control module 15 amplifies the output voltage of the solar cell SC with the amplifier 17 depending on the voltage gain of the amplifier 17 that is set based on determining the output voltage of the photosensor 5 from inquiry task ST2-2, and determines that the brightness around the mobile phone 1 is high enough to detect an operation on the solar cell SC.

If the output voltage of the photosensor 5 is less than 1 V (No branch of inquiry task ST2-2), the control module 15 determines whether the output voltage of the photosensor 5 is equal to or greater than 0.5 V (inquiry task ST2-4). If the output voltage of the photosensor 5 is equal to or greater than 0.5 V (Yes branch of inquiry task ST2-4), process 600 may then continue by the control module 15 setting the voltage gain of the amplifier to 8 dB (task ST2-5). That is, as shown in FIGS. 7A and 7B, because the output voltage of the photosensor 5 is less than 1 V and higher than 0.5 V (predefined value), the control module 15 sets the gain of the amplifier 17 to 8 dB, which is a value that amplifies the output voltage generated by the solar cell SC. This improves detection accuracy for the change in the output voltage generated by the solar cell SC, thereby improves detection accuracy for an operation on the solar cell SC. Process 600 may then continue by the control module 15 reading the voltage output (c) of the amplifier 17 (task ST2-7). In this manner, the control module 15 amplifies the output voltage generated by the solar cell SC with the amplifier 17 depending on the voltage gain of the amplifier 17 that is set based on determining the output voltage of the photosensor 5 from inquiry task ST2-4.

If the output voltage of the photosensor 5 is less than 0.5 V (No branch of inquiry task ST2-4), process 600 may then continue by the control module 15 setting the voltage gain of the amplifier to 14 dB (task ST2-6). In this manner, as shown in FIGS. 7A and 7B, because the output voltage of the photosensor 5 is less than 0.5 V, the control module 15 sets the voltage gain of the amplifier 17 to 14 dB, which is a value that amplifies the output voltage generated by the solar cell SC at higher gain than that in task ST2-5. This improves detection accuracy for the change in the output voltage generated by the solar cell SC, thereby improves accuracy of detection of an operation on the solar cell SC. Process 600 may then continue by the control module 15 reading the voltage output (C) of the amplifier 17 (task ST2-7). In this manner, the control module 15 amplifies the output voltage generated by the solar cell SC with the amplifier 17 depending on the gain of the amplifier 17 that is set based on determining the output voltage of the photosensor 5 from inquiry task ST2-4. Therefore, detection accuracy for the change in the output voltage generated by the solar cell SC is improved thereby improving detection accuracy of an operation on the solar cell SC.

Process 600 may then continue by the control module 15 determining whether a difference between the output voltage (A) of the photosensor 5 and the output voltage (C) amplified by the amplifier 17 is 0.5 V or higher (task ST2-8). If the difference between the output voltage (A) of the photosensor 5 and the output voltage (C) is less than 0.5 V (No branch of inquiry task ST2-8), process 600 leads back to task ST2-1. However, if the difference between the output voltage (A) of the photosensor 5 and the output voltage (C) exceeds 0.5 V (Yes branch of inquiry task ST2-8), process 600 may continue by the control module 15 detecting operation of the solar cell SC and performing processing (task ST2-9). In this manner, the control module 15 determines that an operation is performed on the solar cell SC, and performs a predefined processing depending on that operation.

By configuring the mobile phone 1 in this way, an operation on the solar cell SC is reliably detected even in a dark place. Therefore, the mobile phone 1 can use the solar cell SC as a voltage source that generates voltage, and as an input device.

Figure 8:
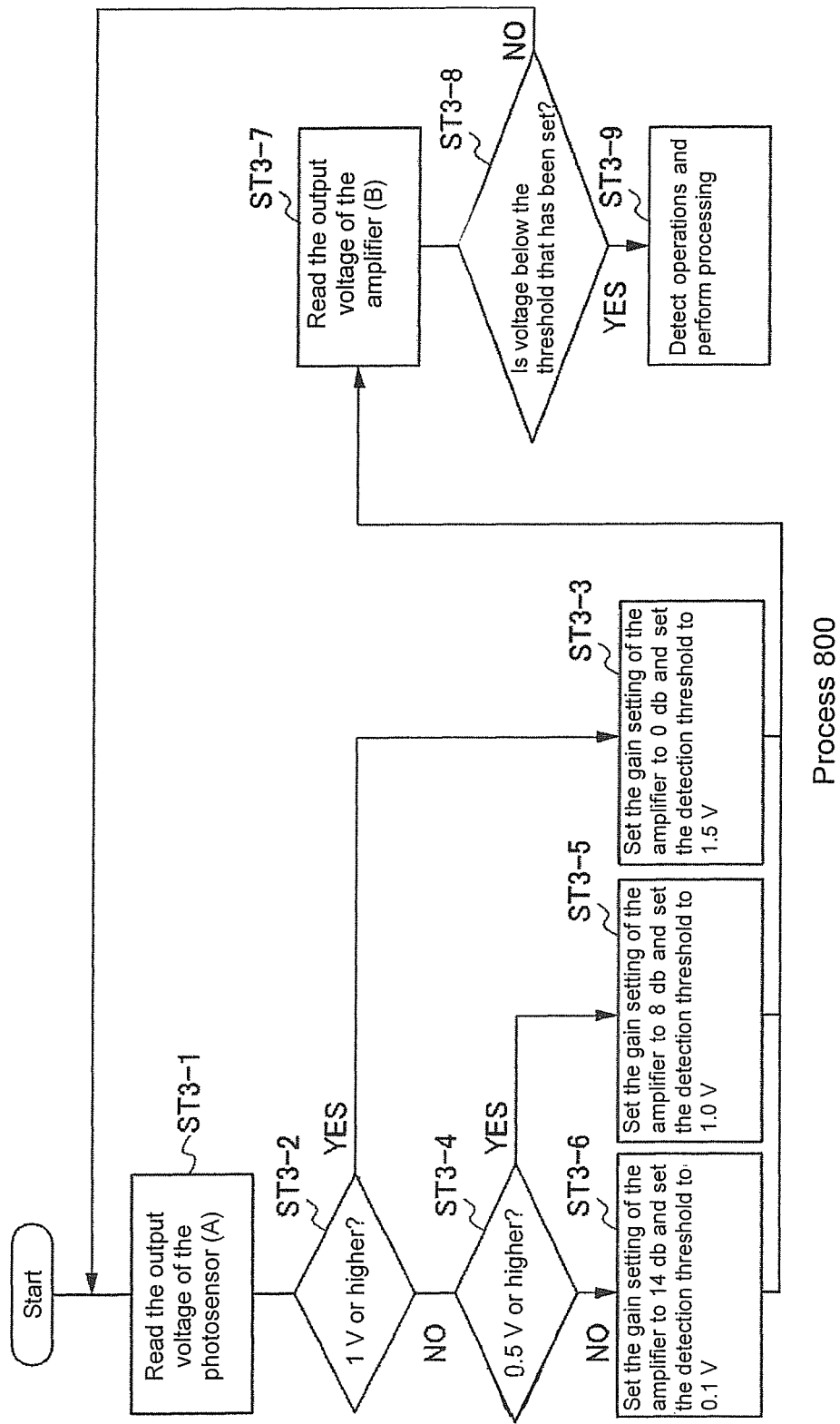
FIG. 8 is an illustration of a flowchart showing an operation of a mobile phone according to an embodiment of the disclosure.

FIG. 8 is an illustration of an exemplary flowchart showing a process 800 of the mobile phone 1 according to an embodiment of the disclosure. The various tasks performed in connection with the process 800 may be performed by software, hardware, firmware, a computer-readable medium having computer executable instructions for performing the process method, or any combination thereof. Process 800 may include any number of additional or alternative tasks, the tasks shown in FIG. 8 need not be performed in the illustrated order, and process 800 may be incorporated into a more comprehensive procedure or process having additional functionality not described in detail herein. For illustrative purposes, the following description of process 800 may refer to elements mentioned above in connection with FIGS. 1-6, 9A-9B, and 10A-10D. In practical embodiments, portions of process 800 may be performed by different elements of the mobile phone 1. The process 800 may have functions, material, and structures that are similar to the embodiments shown in FIGS. 1-5. Therefore common features, functions, and elements may not be redundantly described here.

Figure 9A:
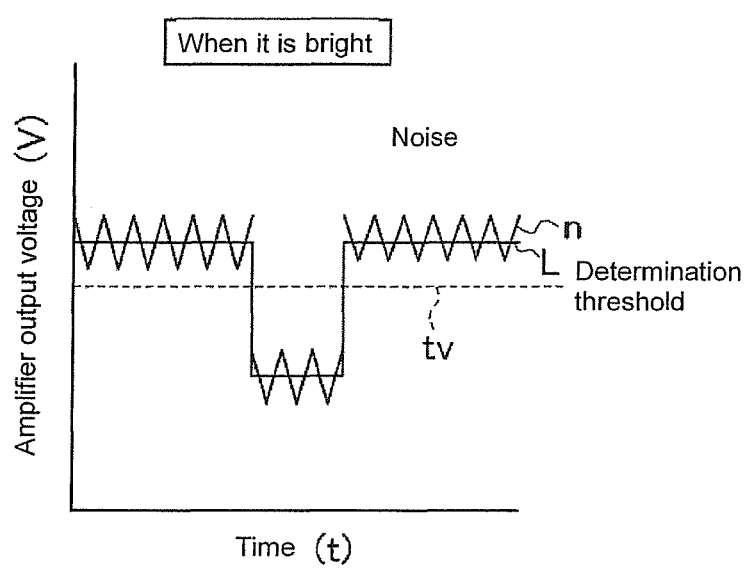
FIG. 9A is a graph showing noise amplified with an amplifier in case surrounding area is bright.
Figure 9B:
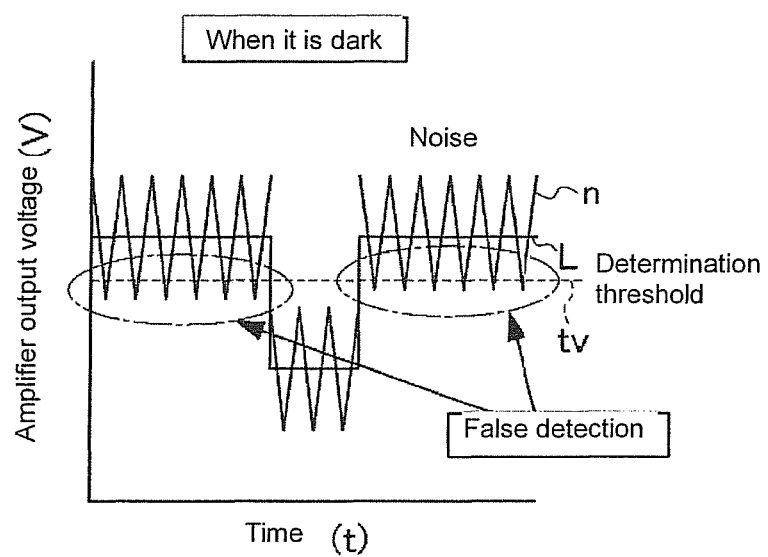
FIG. 9B is a graph showing noise amplified with an amplifier in case a surrounding area is dark.

As shown in FIGS. 9A-9B, a different between the embodiments described above (processes 300 and 600) and the process 800 is mainly in that process 800 takes into account increased noise n due to amplification of the output voltage generated by the solar sell SC in case it is used in a dark place. In this manner, a point at which the threshold Tv for detection of operations for the noise n is set is a main difference with the embodiments described above in the context of discussion of processes 300 and 600 such that false determination due to the noise n can be avoided in the mobile phone 1.

FIG. 9A is an illustration of graph showing amplifier output voltage vs. time when the mobile phone 1 is in a bright environment. FIG. 9A is an illustration of graph showing amplifier output voltage vs. time when the mobile phone 1 is in a dark environment. The voltage gain of the amplifier 17 becomes larger in case the mobile phone 1 is dark as shown in FIG. 9B compared to the gain amplified by the amplifier 17 in case it is bright in FIG. 9A. This is because, as described above in the context of discussion of process 600, the gain of the amplifier 17 set by the control module 15 is larger in case the environment of the mobile phone 1 is dark than in case the environment of the mobile phone 1 is bright. In other words, this is because the noise n is also amplified further in a dark environment compared to a bright environment. Therefore, in a dark environment the noise n may be amplified such that the amplifier output voltage of the noise exceeds a threshold Tv. If the output voltage of the noise n exceeds the threshold Tv, the control module 15 may incorrectly detect an operation on the solar cell SC. Process 800 provides a way to avoid false determination due to the noise n in the mobile phone 1.

Process 800 may begin by the mobile phone 1 reading the output voltage (A) from the photosensor 5 (task ST3-1). Specifically, the control module 15 reads the voltage of the photosensor 5 detected by the second voltage-detection module 16 to detect the brightness around the mobile phone 1.

Process 800 may continue by the control module 15 determining whether the output voltage of the photosensor 5 is greater than or equal to about 1 V (task ST3-2). If the output voltage of the photosensor 5 is greater than or equal to 1 V (Yes branch of inquiry task ST3-2), process 800 may continue by the control module 15, setting the gain setting of the amplifier 17 to 0 dB as shown in FIGS. 10C and 10D, and setting a detection threshold Tv of an operation on the solar cell SC to 1.5 V (task ST3-3). Process 800 may then proceed by the control module 15 reading the output voltage (B) of the amplifier 17 (task ST3-7). If a change in the output voltage generated by the solar cell SC is less than the detection threshold Tv (1.5 V), an operation on the solar cell SC is detected as described below. In this manner, the output voltage generated by the solar cell SC is amplified by the amplifier 17 depending on the gain of the amplifier 17 that is set based on the determination result from tasks ST3-2 which improves detection accuracy for a change in the output voltage of the solar cell SC, and improves detection accuracy for an operation on the solar cell SC.

If the output voltage of the photosensor 5 is less than 1 V (No branch of inquiry task ST3-2), process 800 may proceed by control module 15 determining whether the output voltage of the photosensor 5 is 0.5 V or greater (inquiry task ST3-4). If the output voltage of the photosensor 5 is 0.5 V or greater (Yes branch of inquiry task ST3-4), process 800 may proceed by the control module setting the gain setting of the amplifier 17 to 8 dB as shown in FIGS. 10B and 10D and setting a detection threshold Tv of an operation on the solar cell SC to 1.0 V (task ST3-5). In this manner, the control module 15, as shown in FIG. 10B, lowers the threshold Tv taking the noise n into consideration, because the noise n is increased by an increase in the gain. Process 800 may then proceed by the control module 15 reading the output voltage (B) of the amplifier 17 (task ST3-7). In this manner, the output voltage of the solar cell SC is amplified by the amplifier 17 depending on the voltage gain of the amplifier 17 that is set based on the determination result from tasks ST3-2. This improves detection accuracy for a change in the output voltage of the solar cell SC, and improves detection accuracy for an operation on the solar cell SC.

As shown in FIG. 10D, brightness at the output voltage 1.0 V of the photosensor 5 is approximately 400 lux, which corresponds to outdoor brightness. In this brightness adjustment by the amplifier 17 is not needed.

Figure 10A:
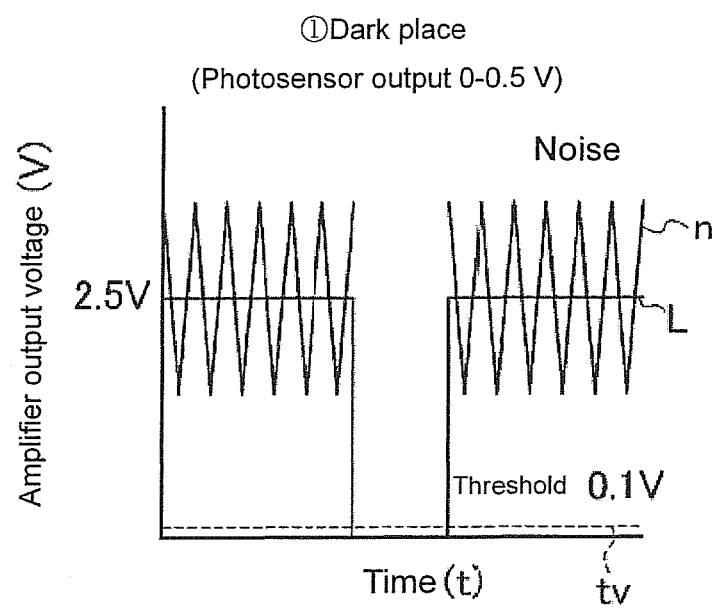
FIG. 10A is an illustration of a graph showing amplifier output voltage vs. time for using a mobile phone in a dark place according to an embodiment of the disclosure.
Figure 10B:
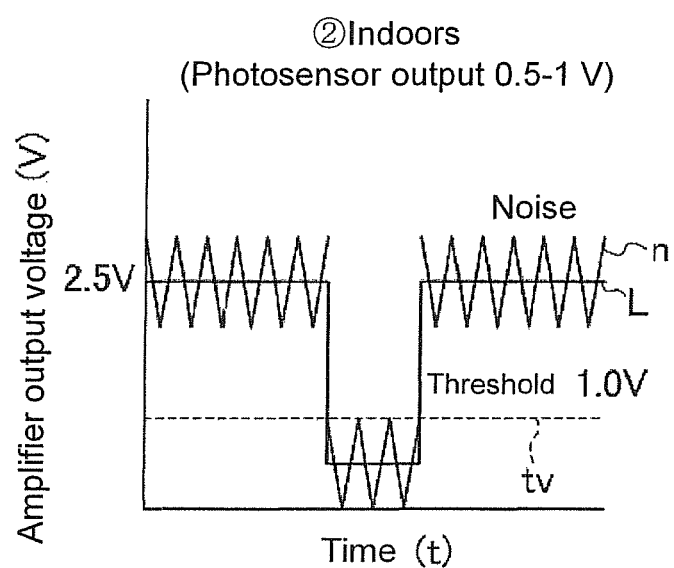
FIG. 10B is an illustration of a graph showing amplifier output voltage vs. time for using a mobile phone in a room according to an embodiment of the disclosure.
Figure 10C:
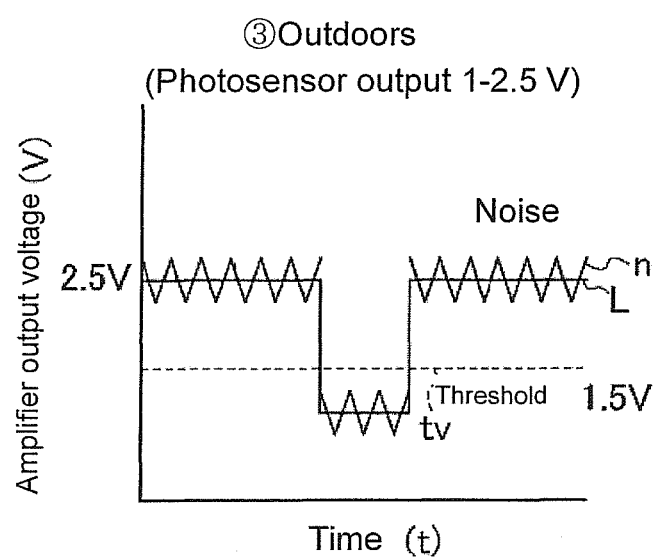
FIG. 10C is an illustration of a graph showing amplifier output voltage vs. time for using a mobile phone outdoors according to an embodiment of the disclosure.

If the output voltage of the photosensor 5 is less than 0.5 V (No branch of inquiry task ST3-4), process 800 may proceed by control module 15, as shown in FIG. 10A and FIG. 10D, setting the voltage gain setting of the amplifier 17 to 14 dB and setting the detection threshold Tv of an operation on the solar cell SC to 0.1 V (task ST3-6). In this manner, the control module 15 lowers the threshold Tv taking the noise n into consideration, because the noise n is increased by an increase in the gain as shown in FIG. 10B. Process 800 may then proceed by the control module 15 reading the output voltage (B) of the amplifier 17 (task ST3-7). In this manner, the output voltage generated by the solar cell SC is amplified by the amplifier 17 depending on the voltage gain of the amplifier 17 that is set based on the determination result from tasks ST3-4. Thereby, detection accuracy is improved for a change in the output voltage generated by the solar cell SC, and improves detection accuracy for an operation on the solar cell SC.

As shown in FIG. 10D, brightness at the output voltage 0.5 V or higher and less than 1.0 V of the photosensor 5 is approximately 200 lux, which corresponds to brightness in a room with electric light is turned on. In other words, it is the brightness at which adjustment by the amplifier 17 is needed.

As shown in FIG. 10D, brightness at the output voltage 0 V or higher and less than 0.5 V of the photosensor 5 is less than 200 lux, which corresponds to the dark place. In other words, it is the brightness at which adjustment by the amplifier 17 is needed.

Process 800 may then continue by the control module 15 determining whether the change in the output voltage (D) amplified by the amplifier 17 below the threshold Tv (inquiry task ST3-8) set at respective tasks ST3-3, ST3-5, and ST3-6. If the change in the output voltage (D) of the amplifier 17 is not below the threshold Tv (NO branch of inquiry task ST3-8), process 800 leads back to task ST3-1. Otherwise, if the change in the output voltage (D) of the amplifier 17 is below the threshold Tv (YES branch of inquiry task ST3-8), process 800 may proceed by the control module determining that an operation on the solar cell SC is performed and performing a predefined processing depending on that operation (task ST3-9).

In this manner the control module 15 controls the mobile phone 1 such that, an operation on the solar cell SC can be reliably detected outdoors as shown in FIG. 10C, indoors as shown in FIG. 10B, or in a dark place as shown in FIG. 10A. Therefore, the mobile phone 1 can use the solar cell SC as a voltage source that generates voltage and as an input device concurrently.

Figure 11:
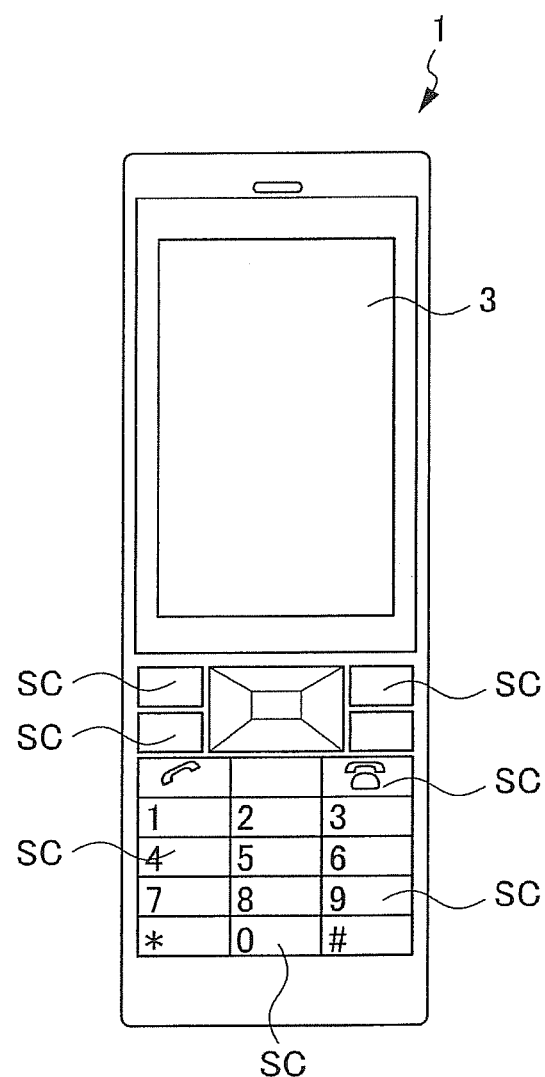
FIG. 11 is an illustration of mobile phone showing alternate locations of solar cells according to an embodiment of the disclosure.

FIG. 11 is an illustration of mobile phone showing alternate locations of solar cells according to an embodiment of the disclosure. In the embodiment While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   at least one solar cell operable to function as a user input key
   a first voltage-detection module operable to detect an output voltage of the at least one solar cell to obtain a detected output voltage;
   an adjustment module operable to amplify the output voltage; and
   a control module operable to:
      to control the adjustment module such that the output voltage is amplified to a predefined voltage value, if an amount of light detected by a photosensor is less than a predefined lumen value;
      detect an operation of the user input key based on the amplified output voltage; and
      perform a predefined control based on the operation.

2. The mobile electronic device of claim 1, wherein the control module detects the operation and performs the predefined control, if a change in the detected output voltage exceeds a threshold.

3. The mobile electronic device of claim 1, wherein the adjustment module amplifies the output voltage to a predefined value to obtain an adjusted voltage, and the control module detects the operation and performs the predefined control if the adjusted voltage exceeds a threshold, such that likelihood of false detection is reduced.

4. The mobile electronic device of claim 1, wherein the control module is further operable to control the adjustment module such that the output voltage is amplified to a first predefined value, if a change in the output voltage is less than a predefined value.

5. The mobile electronic device of claim 1,
   wherein the control module detects the operation and performs the predefined control, if a change in the output voltage exceeds a threshold,
   wherein the control module is further operable to change the threshold based on an amount of amplification of the output voltage.

6. The mobile electronic device of claim 1, further comprising:
   a photosensor; and
   a second voltage-detection module operable to detect a photosensor output voltage of the photosensor.

7. The mobile electronic device of claim 6, wherein the control module detects the operation and performs the predefined control, if a difference between the output voltage and the photosensor output voltage is greater than a threshold.

8. The mobile electronic device of claim 6, further comprising a case, wherein the at least one solar cell and the photosensor are placed in the case such that their respective portions exposed to an outside are coplanar.

9. The mobile electronic device of claim 1, further comprising:
   a case; and
   a display screen, wherein
   the at least one solar cell is light-permeable such that the display screen is viewable from outside the case through the at least one solar cell.

10. A method for operating a mobile electronic device comprising:
   monitoring an output voltage of at least one solar cell, the at least one solar cell operable to function as a user input key;
   detecting the output voltage;
   amplifying the output voltage to a predefined voltage value, if an amount of light detected by a photosensor is less than a predefined lumen value;
   detecting an operation of the user input key based on the amplified output voltage; and
   performing a predefined control based on the operation.

11. The method of claim 10, further comprising detecting the operation and performing the predefined control, if a change in the output voltage exceeds a threshold.

12. The method of claim 11, further comprising changing the threshold based on an amount of amplification of the output voltage.

13. The method of claim 10, wherein the at least one solar cell is a plurality of solar cells, the method further comprising detecting the operation of the user input key and performing the predefined control, if a change in an output voltage of some of the solar cells of the plurality of solar cells exceeds a threshold.

14. The method of claim 10, further comprising adjusting output voltage of the at least one solar cell, if the output voltage is less than a predefined value.

15. The method of claim 10, further comprising:
   detecting a photosensor output voltage of a photosensor; and
   performing the predefined control, if a difference between the output voltage and the photosensor output voltage is greater than a threshold.

16. A device comprising:
   at least one solar cell operable to function as a user input key;
   a voltage-detection module operable to detect an output voltage of the at least one solar cell to obtain a detected output voltage;
   an adjustment module operable to amplify the output voltage; and
   a control module operable to:
      to control the adjustment module such that the output voltage is amplified to a predefined voltage value, if an amount of light detected by a photosensor is less than a predefined lumen value;
      detect an operation of the user input key based on the amplified output voltage; and
      perform a predefined control in response to detecting the operation.

17. The device of claim 16, wherein the at least one solar cell is operable to charge an electronic component and function as a user input device.

* * * * *